(12) United States Patent
Kim (10) Patent No.: US 12,263,898 B2
(45) Date of Patent: Apr. 1, 2025

(54) VEHICLE STEERING DEVICE AND VEHICLE STEERING METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 217 days.

(21) Appl. No.: 17/992,787

(22) Filed: Nov. 22, 2022

(65) Prior Publication Data

US 2023/0159095 A1    May 25, 2023

(30) Foreign Application Priority Data

Nov. 25, 2021    (KR) .......................... 10-2021-0164668

(51) Int. Cl.
*B62D 5/04*    (2006.01)
*B60Q 9/00*    (2006.01)
*B62D 15/02*    (2006.01)

(52) U.S. Cl.
CPC ............. *B62D 5/0484* (2013.01); *B60Q 9/00* (2013.01); *B62D 5/046* (2013.01); *B62D 15/0215* (2013.01); *B62D 15/025* (2013.01)

(58) Field of Classification Search
CPC ...... B62D 5/0484; B62D 5/046; B62D 5/001; B62D 5/0481; B62D 5/005; B62D 5/0454; B62D 5/0463; B62D 15/025; B62D 15/0215; B62D 15/021; B60Q 9/00; B60W 50/029; B60W 50/14; B60W 60/0016; B60W 2050/0292; B60W 2050/143; B60W 2540/18; B60D 6/10; B60Y 2400/307

USPC ........................................ 701/41, 42, 43, 44
See application file for complete search history.

(56) References Cited

FOREIGN PATENT DOCUMENTS

| JP | 2003170857 | * | 6/2003 | ............... B62D 6/00 |
| JP | 2004359000 | * | 12/2004 | ............... B62D 6/00 |
| JP | 3729015 | * | 12/2005 | ............... B62D 5/04 |
| JP | 2012116292 | * | 6/2012 | ............... B62D 6/00 |
| JP | 2016-078567 | | 5/2016 | |
| JP | 2021-142835 | | 9/2021 | |
| KR | 10-2011-0041036 | | 4/2011 | |
| KR | 10-2014-0118145 | | 10/2014 | |

(Continued)

OTHER PUBLICATIONS

Office Action dated Jan. 23, 2024 for Korean Patent Application No. 10-2021-0164668 and its English translation from Global Dossier.

(Continued)

*Primary Examiner* — Hai H Huynh
(74) *Attorney, Agent, or Firm* — WOMBLE BOND DICKINSON (US) LLP (57) ABSTRACT

The present disclosure provides a vehicle steering device and a vehicle steering method capable of ensuring safety of a passenger and a vehicle when a steering abnormality of the vehicle occurs. The vehicle steering device includes a steering input unit, a steering output unit connected to the steering input unit and a wheel, and a control unit configured to control the steering input unit and the steering output unit, in which, when a steering abnormality occurs in the steering input unit, the control unit directly controls the steering output unit regardless of the operation of the steering input unit.

18 Claims, 5 Drawing Sheets

(56) References Cited

FOREIGN PATENT DOCUMENTS

KR     10-2020-0028744     3/2020

OTHER PUBLICATIONS

Office Action dated Aug. 29, 2023 for Korean Patent Application No. 10-2021-0164668 and its English translation provided by Applicant's Foreign Counsel.

* cited by examiner

VEHICLE STEERING DEVICE AND VEHICLE STEERING METHOD

CROSS REFERENCE TO RELATED APPLICATION

The present application claims priority to Korean Patent Application No. 10-2021-0164668, filed Nov. 25, 2021, the entire contents of which is incorporated herein for all purposes by this reference.

TECHNICAL FIELD

The present disclosure relates to a vehicle steering device and a vehicle steering method capable of ensuring safety of a passenger and a vehicle when a steering abnormality of the vehicle occurs.

BACKGROUND

A vehicle steering device is a system that assists in changing a traveling direction of a vehicle at a driver's will, and may include a system that assists a driver in driving a vehicle more easily by generating a steering assistance force in a desired traveling direction.

SUMMARY

In view of the above, the present disclosure provides a vehicle steering device and a vehicle steering method capable of ensuring safety of a passenger and a vehicle when a steering abnormality of the vehicle occurs.

According to embodiments of the present disclosure, a vehicle steering device includes: a steering input unit; a steering output unit connected to the steering input unit and a wheel; and a control unit configured to control the steering input unit and the steering output unit, in which, when a steering abnormality occurs in the steering input unit, the control unit directly controls the steering output unit regardless of the operation of the steering input unit.

When the steering abnormality occurs in the steering input unit, the control unit may directly control the steering output unit according to a preset autonomous driving mode.

The autonomous driving mode may include a limp aside operation.

When a steering abnormality of the steering input unit occurs, the control unit may warn the steering abnormality.

When the steering abnormality occurs in the steering input unit, the control unit may turn on a first warning light to warn the steering abnormality.

When an abnormality occurs in a steering reaction force of the steering input unit, the control unit may control the steering output unit through the steering input unit.

When an abnormality occurs in the steering reaction force of the steering input unit, the control unit may warn that an abnormality has occurred in the steering reaction force.

When the abnormality occurs in the steering reaction force of the steering input unit occurs, the control unit may turn on a second warning light to warn the abnormality in the steering reaction force.

The steering input unit may include: a torque sensor configured to detect a torque of a steering wheel; a first steering sensor configured to detect a steering angle of the steering wheel; a first reducer connected to the steering wheel; and a steering control module configured to control the first reducer based on a torque signal from the torque sensor and a steering signal from the first steering sensor.

The steering control module may include: a first steering motor connected to the first reducer; and a first electronic control unit configured to control the first steering motor based on the torque signal from the torque sensor and the steering signal from the first steering sensor.

The steering output unit may include: a second steering sensor configured to detect a steering angle of the steering wheel; a second reducer connected to a wheel steering unit for controlling the steering of the wheel; and a wheel control module configured to control the second reducer based on control from at least one of the steering input unit and the control unit and transmit a steering signal from the second steering sensor to the steering input unit.

The wheel control module may include: a second steering motor connected to the second reducer; and a second electronic control unit configured to control the second steering motor based on control from at least one of the steering input unit and the control unit.

The steering input unit and the steering output unit may be connected by a wire.

According to embodiments of the present disclosure, a vehicle steering method by a vehicle steering device including a steering input unit including a steering wheel, a torque sensor detecting a torque of the steering wheel, a steering sensor detecting a steering angle of the steering wheel, and a steering output unit connected to the steering input unit a wheel, the vehicle steering method includes: determining whether a torque signal is generated from the torque sensor; determining whether a steering signal is generated from the steering sensor when the torque signal is generated from the torque sensor; and directly controlling the steering output unit when the steering signal is not generated from the steering sensor, regardless of an operation of the steering input unit.

The direct controlling of the steering output unit may include directly controlling the steering output unit according to a preset autonomous driving mode.

The autonomous driving mode may include a limp aside operation.

The vehicle steering method may further include: warning a steering abnormality when the steering signal is not generated from the steering sensor.

The warning of the steering abnormality may include turning on a first warning light.

The vehicle steering method may further include determining whether a driving current is applied to the steering motor when a torque detection signal is generated from the torque sensor.

The determining whether the steering detection signal is generated may be performed when the driving current is not applied to the steering motor.

The vehicle steering method may further include determining whether the steering signal is greater than or equal to a preset reference value when the driving current is applied to the steering motor.

The vehicle steering method may further include controlling the steering output unit through the steering input unit when the steering signal is greater than or equal to the reference value.

When the steering signal is smaller than the reference value, the direct controlling of the steering output unit may be performed regardless of the operation of the steering input unit.

The vehicle steering method may further include controlling the steering output unit through the steering input unit when the steering signal is generated from the steering sensor; and warning that the abnormality has occurred in the steering reaction force of the steering wheel.

The vehicle steering method may further include confirming whether the steering signal is greater than or equal to the preset reference value when a steering detection signal is generated from the steering sensor.

The vehicle steering method may further include controlling the steering output unit through the steering input unit when the steering signal is greater than or equal to the reference value; and warning that the abnormality has occurred in the steering reaction force of the steering wheel.

When the steering signal is smaller than the reference value, the direct controlling of the steering output unit may be performed regardless of the operation of the steering input unit.

According to an embodiment of the present disclosure, when an abnormality occurs in steering, a vehicle transitions to an autonomous driving mode, and the vehicle may be moved to a shoulder and parked based on a limp aside operation of the autonomous driving mode. Accordingly, the safety of the passengers may be secured when a steering error of the vehicle occurs.

The effect of the present disclosure is not limited to the above-described effects, and other effects not described will be clearly understood by those of ordinary skill in the art to which the present disclosure belongs (hereinafter, referred to as "those skilled in the art") from the description of the claims.

DETAILED DESCRIPTION

Various advantages and features of the present disclosure and methods accomplishing them will become apparent from the following description of embodiments with reference to the accompanying drawings. However, the present disclosure is not limited to the embodiments disclosed herein, but will be implemented in various forms. The embodiments make contents of the present disclosure thorough and are provided so that those skilled in the art can easily understand the scope of the present disclosure. Therefore, the present disclosure will be defined by the scope of the appended claims. Accordingly, in some embodiments, well-known process steps, well-known device structures, and well-known techniques have not been specifically described in order to avoid obscuring the present invention. Throughout the specification, the same components will be denoted by the same reference numerals.

In the drawings, thicknesses are exaggerated in order to clearly represent several layers and areas. Throughout the present disclosure, like components will be denoted by like reference numerals.

In the present specification, when a part is connected to another part, it includes not only the case where it is directly connected, but also the case where it is electrically connected with another element interposed therebetween. In addition, unless explicitly described to the contrary, "including" any component will be understood to imply the inclusion of other components rather than the exclusion of other components.

In the present specification, the terms such as "first", "second", and "third", may be used to describe various components, but the components are not to be construed as being limited to the terms. The terms are used only in order to distinguish one component from another component. For example, without departing from the scope of the present invention, a first component may be referred to as a second or third component, and similarly, second or third component may be alternately named.

Unless defined otherwise, all terms (including technical and scientific terms) used in the present specification have the same meaning as meanings commonly understood by those skilled in the art to which the present disclosure pertains. In addition, terms defined in commonly used dictionaries are not ideally or excessively interpreted unless explicitly defined otherwise.

Hereinafter, a vehicle steering device and a vehicle steering method according to an embodiment of the present disclosure will be described in detail with reference to FIGS. 1 to 5.

Figure 1:
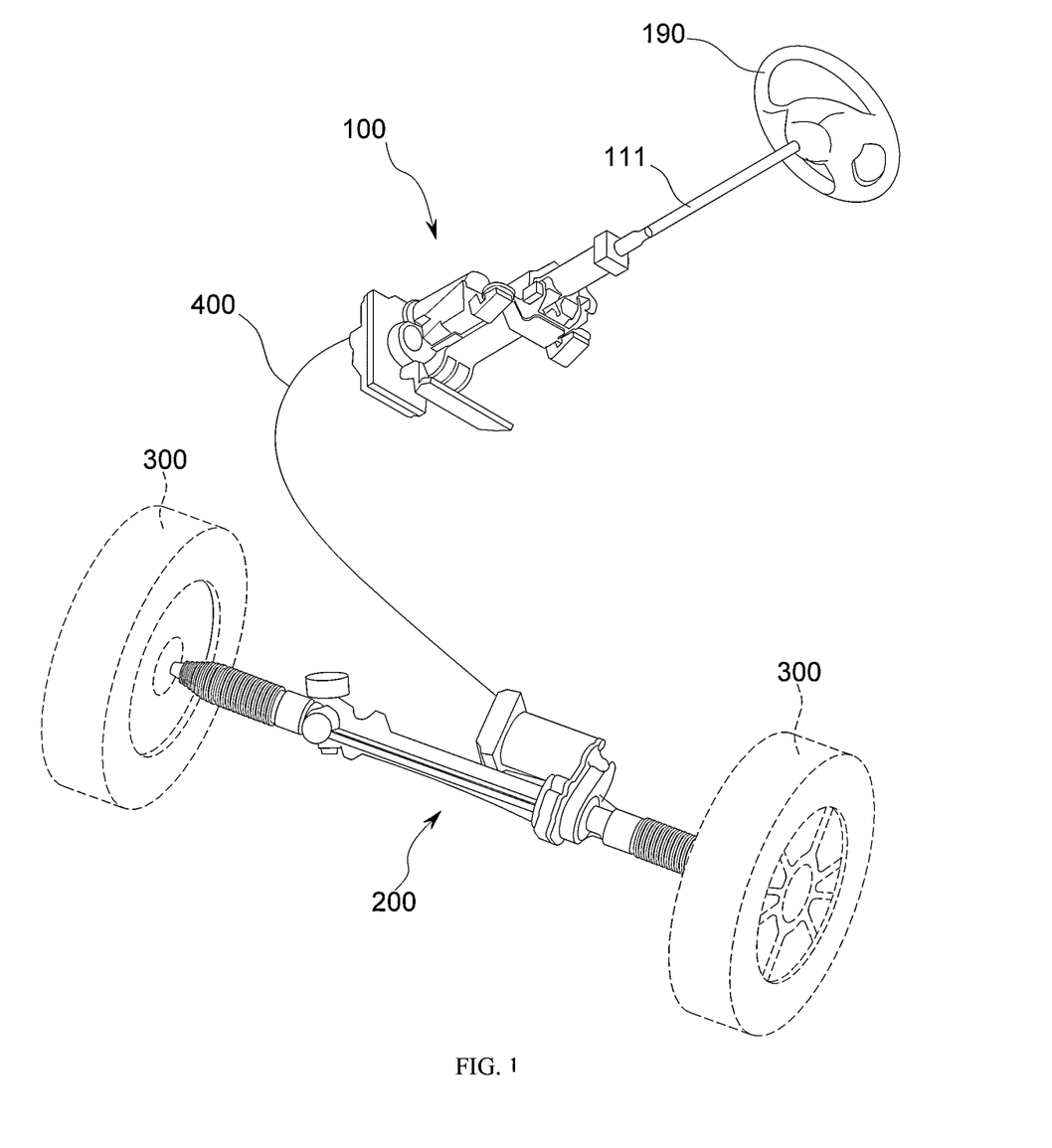
FIG. 1 is a three-dimensional view of a steering input unit and a steering output unit of a vehicle steering device according to an embodiment of the present disclosure.
Figure 2:
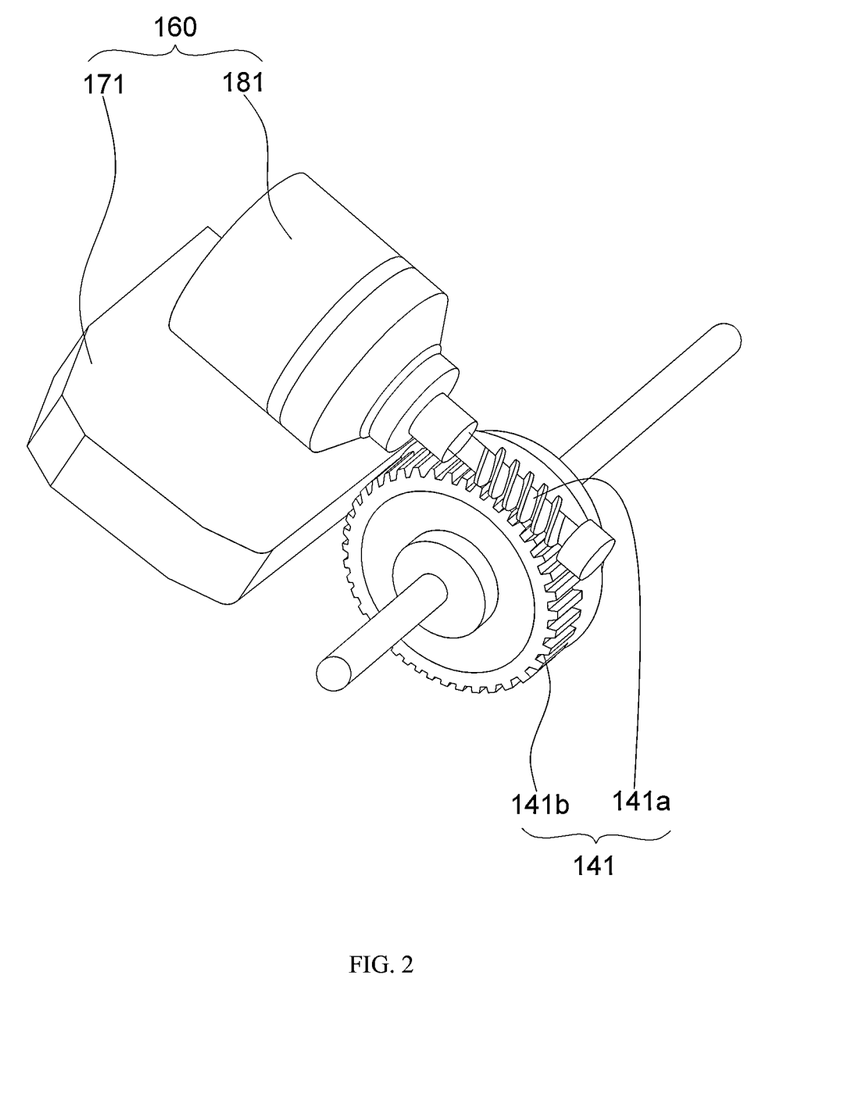
FIG. 2 is a three-dimensional view of a steering control module of the steering input unit of FIG. 1.
Figure 3:
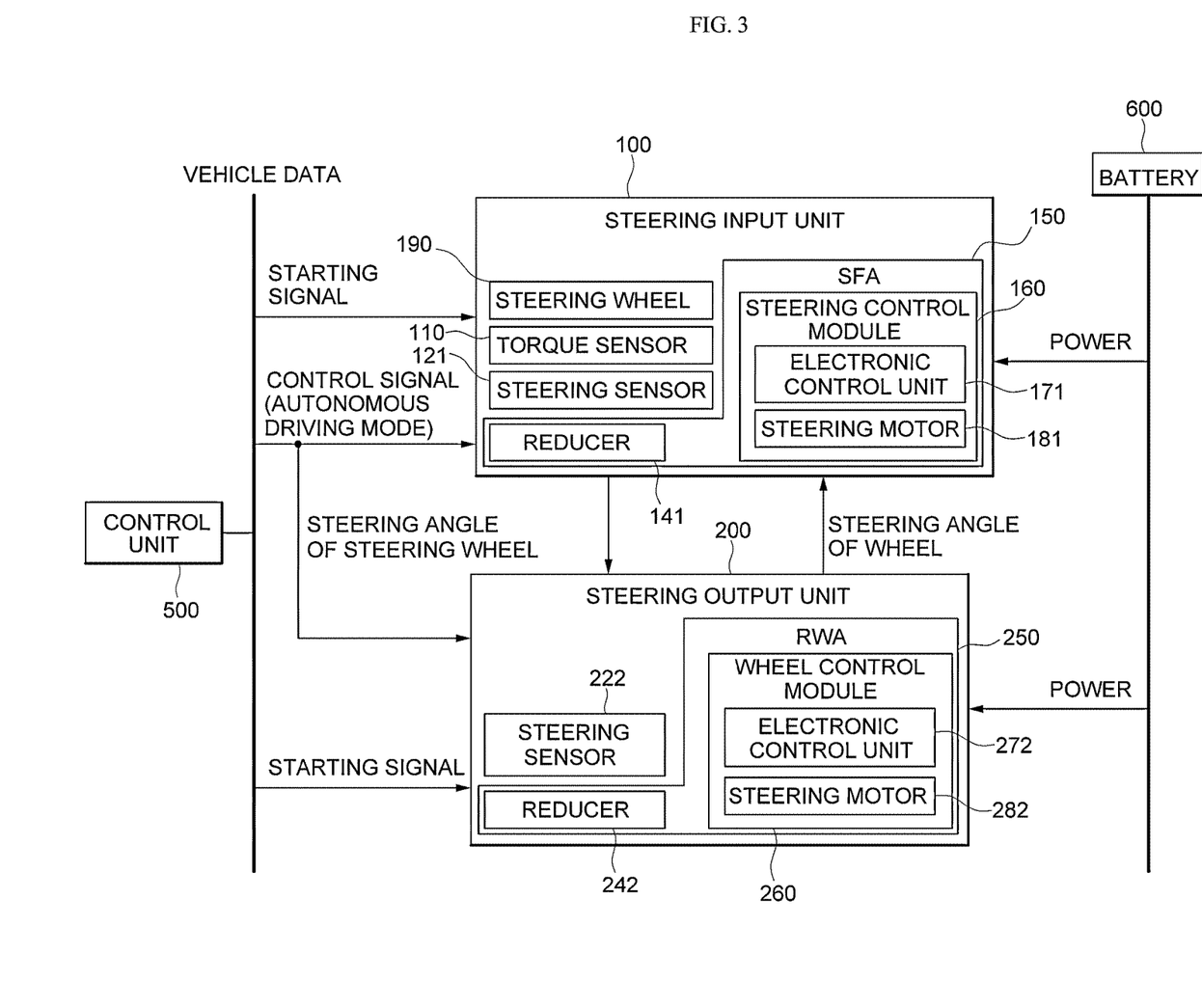
FIG. 3 is a block configuration diagram of the steering input unit and the steering output unit of FIG. 1.

FIG. 1 is a three-dimensional view of a steering input unit 100 and a steering output unit 200 of a vehicle steering device according to an embodiment of the present disclosure, FIG. 2 is a three-dimensional view of a steering control module 160 of the steering input unit 100 of FIG. 1, and FIG. 3 is a block configuration diagram of the steering input unit 100 and the steering output unit 200 of FIG. 1.

A vehicle steering device according to an embodiment of the present disclosure may include the steering input unit 100 and the steering output unit 200 as illustrated in FIG. 1. Here, the steering input unit 100 may be a steering column, and the steering output unit 200 may be a steering rack.

As illustrated in FIG. 1, the steering input unit 100 and the steering output unit 200 may be electrically connected to each other by a wire 400. For example, the steering input unit 100 and the steering output unit 200 may have a steer by wire (SBW) structure.

The steering input unit 100 and the steering output unit 200 may receive vehicle data (e.g., vehicle data of a controller area network (CAN) protocol). For example, the operations of the steering input unit 100 and the steering output unit 200 may start by a starting signal. Also, the steering input unit 100 and the steering output unit 200 may receive power from a battery 600.

Various signals (e.g., a steering signal (hereinafter, first steering signal) including information on a steering angle of a steering wheel 190) from the steering input unit 100 may be supplied to the steering output unit 200 through the wire 400. The steering output unit 200 may be controlled according to various signals (e.g., the first steering signal described above) from the steering input unit 100 to control steering of wheels 300 connected to both sides of the steering output unit 200.

In addition, various signals (e.g., a steering signal (hereinafter, second steering signal) including information on a steering angle of the wheel 300) from the steering input unit 100 may be supplied to the steering input unit 100 through the wire 400. The steering input unit 100 may compare the second steering signal from the steering output unit 200 with the first steering signal to determine whether the wheel 300 is accurately steered according to the steering angle of the steering wheel 190. If it is checked as a result of the determination that the steering angle of the wheel 300 is not correct, the steering input unit 100 may correct the first steering signal and supply the corrected first steering signal to the steering output unit 200.

As illustrated in FIG. 3, the steering input unit 100 may include the steering wheel 190, a steering feedback actuator 160 (SFA), a torque sensor 110, and a steering sensor 121 (hereinafter, a first steering sensor 121).

The torque sensor 110 may detect a torque applied to the steering wheel 190 and output an electrical signal (e.g., a torque signal) proportional to the detected torque.

The first steering sensor 121 may detect the steering angle of the steering wheel 190 and output an electric signal (e.g., a first steering signal) proportional to the detected steering angle. Here, the steering signal may include information on a rotation angle of the steering wheel 190.

As illustrated in FIG. 3, the steering feedback actuator 160 may include a reducer 141 (hereinafter, referred to as a first reducer 141) and a steering control module 160.

As illustrated in FIG. 2, the first reducer 141 may include a worm 141a and a worm wheel 141b that are geared to each other, and the above-described steering wheel 190 may be connected to a shaft of the worm wheel 141b through a steering shaft 111.

The steering control module 160 may control the first reducer 141 based on the torque signal from the torque sensor 110, the first steering signal from the first steering sensor 121, and a vehicle speed signal from a vehicle speed sensor. As illustrated in FIG. 3, the steering control module 160 may include an electronic control unit 171 (hereinafter, a first electronic control unit 171) and a steering motor 181 (hereinafter, a first steering motor 181).

The first electronic control unit 171 may control the first steering motor 181 based on the torque signal from the torque sensor 110, the first steering signal from the first steering sensor 121, and the vehicle speed signal from the vehicle speed sensor. The first electronic control unit 171 may control the first steering motor 181 to decrease a resistance force (e.g., reaction force) applied to the steering wheel 190 in order to secure an easy steering force at low speed, and control the first steering motor 181 to increase a resistance force (e.g., reaction force) applied to the steering wheel 190 to ensure stability at high speed. Here, as illustrated in FIG. 2, a driving shaft of the first steering motor 181 may be connected to the shaft of the worm 141a provided in the first reducer 141.

As illustrated in FIG. 3, the steering output unit 200 may include a steering sensor 222 (hereinafter, a second steering sensor 222) and a road wheel actuator 250 (RWA).

The second steering sensor 222 may detect the steering angle of the wheel 300 and output an electric signal (e.g., a second steering signal) proportional to the detected steering angle. Here, the second steering signal from the second steering sensor 222 may include information on the rotation angle of the wheel 300.

The road wheel actuator 250 may include a reducer 242 (hereinafter, referred to as a second reducer 242) and a wheel control module 260.

The second reducer 242 may be connected to a wheel steering unit of the steering output unit 200. For example, the wheel steering unit may include a pinion shaft connected to the second reducer 242, a rack-and-pinion mechanism connected to the pinion shaft, a rack bar connected to the rack-and-pinion mechanism, a tie rod connected to both sides of the rack bar, and a knuckle arm connected between the tie rod and the wheel 300. Here, the pinion shaft may be connected to, for example, the shaft of the worm wheel of the second reducer 242.

The wheel control module 260 may control the second reducer 242 based on control from at least one of the steering input unit 100 and the control unit 500. For example, the wheel control module 260 may control the second reducer 242 based on at least one of the first steering signal from the steering input unit 100 and the steering control signal from the control unit 500. As illustrated in FIG. 3, the steering control module 260 may include an electronic control unit 272 (hereinafter, a second electronic control unit 272) and a steering motor 282 (hereinafter, a second steering motor 282).

The second electronic control unit 272 may control the second steering motor 282 based on at least one of the first steering signal from the steering input unit 100 and the steering control signal from the control unit 500. The driving shaft of the second steering motor 282 may be connected to, for example, a shaft of a worm provided in the second reduction gear 242.

The control unit 500 may control the steering input unit 100 and the steering output unit 200. For example, when it is determined that there is no abnormality in the steering and reaction force of the steering wheel 190, the control unit 500 may provide the steering angle (e.g., the first steering signal) of the steering wheel 190 calculated from the steering input unit 100 to the steering output unit 200. In other words, when the steering wheel 190 is normally steered according to a driver's will, and the reaction force applied to the steering wheel 190 is normally generated, the first steering signal detected by the steering input unit 100 may be transmitted to the steering output unit 200. The first steering signal may be transmitted to the steering output unit 200 by, for example, the wire 400 described above. The steering output unit 200 receiving the first steering signal may steer the wheel 300 (e.g., the front right wheel and the front left wheel) with a magnitude corresponding to the first steering signal. As such, when there is no abnormality in the steering and reaction force of the steering wheel 190, the steering of the vehicle may be manually controlled by a driver.

On the other hand, while the steering of the steering wheel 190 is normally controlled, when an abnormality occurs in the reaction force of the steering wheel 190, as described above, the control unit 500 may control the first steering signal from the steering input unit 100 to be transmitted to the steering output unit 200, and may additionally perform an operation of warning the reaction force abnormality of the steering wheel 190. For example, the control unit 500 may turn on a yellow warning light to warn the reaction force abnormality. Meanwhile, additionally and alternatively, the control unit 500 may output a warning sound to warn the reaction force abnormality.

The above-described reaction force abnormality may occur, for example, when the first steering motor 181 is not driven. This may be caused by an electrical connection error between the first steering motor 181 and the battery 600. As a specific example, power from the battery 600 is not supplied to the first steering motor 181, so, despite the normal control of the first electronic control unit 171, the first steering motor 181 may not be driven when the driving current is not supplied to the first steering motor 181. When the first steering motor 181 is not driven, and thus, no reaction force is generated, due to the high steering resistance force of the steering wheel 190 at low speed and the low steering resistance force of the steering wheel 190 at high speed, it is difficult to quickly steer the steering wheel 190 at low speed, and it is likely to cause the deterioration in stability at high speed. However, the cause of the above-described reaction force abnormality is only one example, and in addition to this, the reaction force abnormality may occur due to various causes.

Meanwhile, when the steering angle abnormality of the steering input unit 100 occurs, the control unit 500 may directly control the steering output unit 200 regardless of the operation of the steering input unit 100. For example, when there is a problem in the steering of the steering wheel 190 while the reaction force of the steering wheel 190 is normally generated, the control unit 500 may block the first steering signal generated from the steering input unit 100 from being transmitted to the steering. In addition, the control unit 500 may directly control the steering output unit 200. In other words, when there is a problem in the steering of the steering wheel 190, the control unit 500 may control the steering output unit 200 instead of the steering input unit 100. For example, the control unit 500 may directly control the steering output unit 200 according to a preset autonomous driving mode. Herein, the autonomous driving mode may include a limp aside operation. For example, the control unit 500 may directly control the steering output unit 200, so that the wheel 300 connected to the steering output unit 200 may be automatically steered according to the limp aside operation of the autonomous driving mode described above. According to the limp aside operation of the autonomous driving mode, the vehicle may be moved to a safe shoulder.

In addition, when a control right of the vehicle is transferred to the autonomous driving mode due to the problem of the steering wheel 190 as described above, the control unit 500 may additionally perform an operation of warning the steering abnormality of the steering wheel 190. For example, the control unit 500 may turn on a red warning light to warn the steering abnormality. Meanwhile, additionally and alternatively, the control unit 500 may output a warning sound to warn the steering abnormality.

The above-described steering abnormality may occur, for example, when the steering shaft does not rotate due to foreign objects inserted between the worm 141a and the worm wheel 141b of the first reducer 141, when the steering shaft does not rotate due to damage to the first reduction gear 141, etc., or errors of the first steering sensor 121, etc. However, the cause of the above-described steering abnormality is only one example, and in addition to this, the steering abnormality may occur due to various causes.

Meanwhile, even when there is a problem in both the reaction force of the steering wheel 190 and the steering of the steering wheel 190, the control unit 500 may directly control the steering output unit 200 as described above regardless of the operation of the steering input unit 100. In other words, regardless of whether the reaction force of the steering wheel 190 is abnormal, when the abnormality occurs in the steering of the steering wheel 190, the control unit 500 may directly control the steering output unit 200 based on the limp aside operation of the autonomous driving mode.

Figure 4:
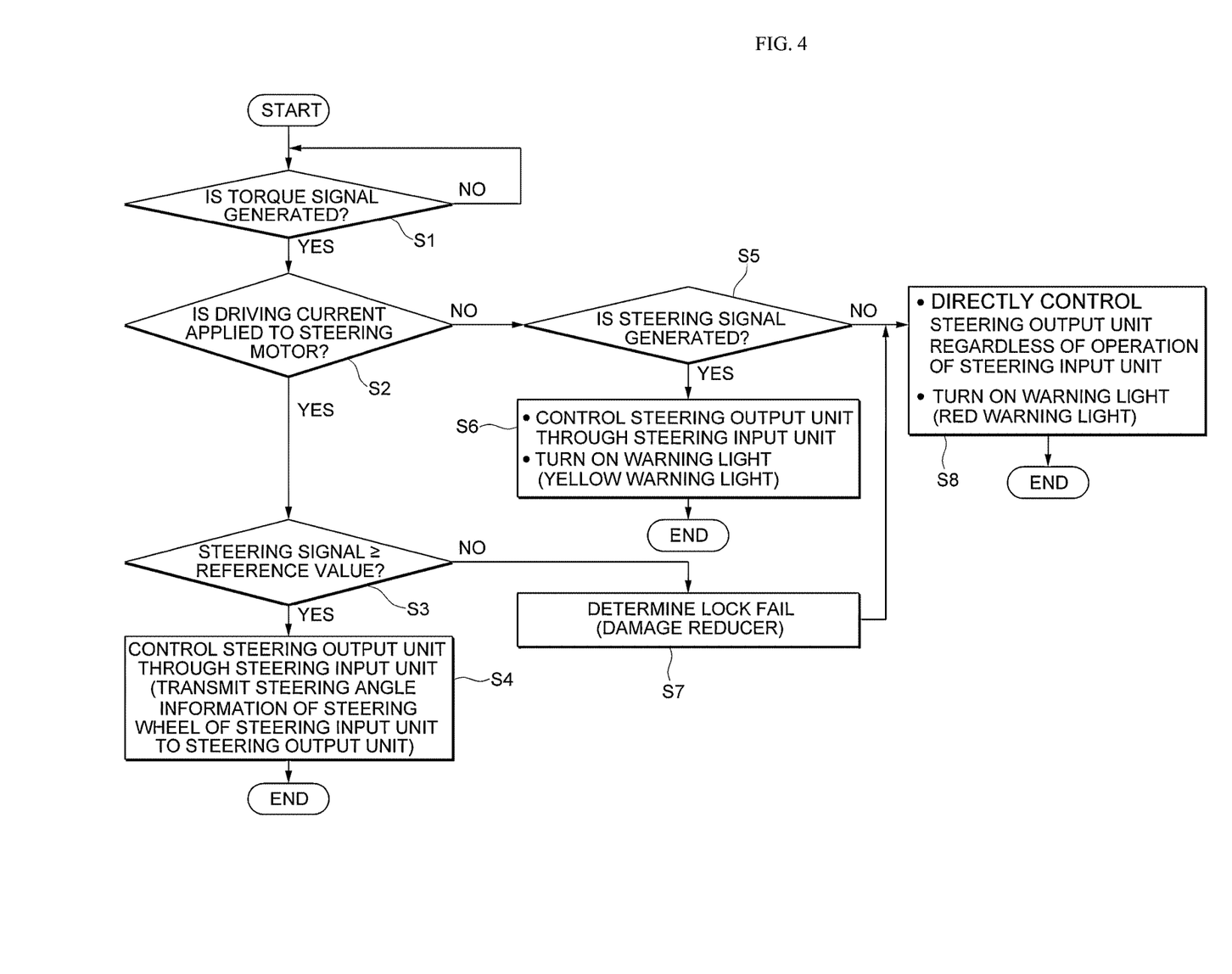
FIG. 4 is a flowchart illustrating an example of a vehicle steering method according to an embodiment of the present disclosure.

FIG. 4 is a flowchart illustrating an example of a vehicle steering method according to an embodiment of the present disclosure.

A vehicle steering method according to an embodiment of the present disclosure may be performed by a processor (e.g., a vehicle and/or at least one processor in the vehicle). For example, the vehicle steering method according to the embodiment of the present disclosure may be initiated by the processor receiving a torque detection signal from the torque sensor 110.

First, as illustrated in FIG. 4, the processor determines whether a torque signal is generated from the torque sensor 110 (S1).

When it is confirmed as a result of the determination in step S1 that the torque signal is generated (e.g., when it is confirmed that the driver's will to steer is present), the processor determines whether the driving current is supplied to the first steering motor 181 (S2).

When it is confirmed as a result of the determination in step S2 that the driving current is supplied to the first steering motor 181 (e.g., when it is confirmed that the reaction force is normally generated by operating the first steering motor 181 by the driving current), the processor compares the first steering signal with a preset reference value (S3). For example, the processor determines whether the first steering signal is greater than or equal to a reference value (S3). Here, the first steering signal compared with the reference value may be, for example, an absolute value of the first steering signal. In other words, the first steering signal may have a positive polarity when the steering wheel 190 rotates to the right, and a negative polarity when the steering wheel 190 rotates to the left. Considering this, in the comparison in step S2, the first steering signal may be corrected to the absolute value and compared with the reference value.

When it is confirmed as a result of the comparison in step S3 that the first steering signal is greater than or equal to the reference value (e.g., when it is confirmed that the steering wheel 190 is steered normally), the processor controls the steering output unit 200 through the steering input unit 100 (S4). For example, the processor controls the steering angle (e.g., the first steering signal) of the steering wheel 190 calculated from the steering input unit 100 to be transmitted to the steering output unit 200. In other words, when the reaction force applied to the steering wheel 190 is normally generated and the steering wheel 190 is normally steered according to the driver's will, the first steering signal detected by the steering input unit 100 may be transmitted to the steering output unit 200. Then, the steering output unit 200 controls the steering of the wheel 300 according to the received first steering signal.

When it is confirmed as a result of the determination in step S2 described above that the driving current is not supplied to the first steering motor 181 (e.g., when it is confirmed that no reaction force is generated because the driving current is not supplied to the first steering motor 181), the processor determines whether the first steering signal is generated (S5).

When it is determined as a result of the determination in step S5 that the first steering signal is generated, the processor controls the steering output unit 200 through the steering input unit 100 (S6). For example, the processor controls the steering angle (e.g., the first steering signal) of the steering wheel 190 calculated from the steering input unit 100 to be transmitted to the steering output unit 200. Accordingly, the processor warns that the reaction force abnormality has occurred by turning on the yellow warning light.

Meanwhile, when it is determined as a result of the determination in step S5 that the first steering signal is not generated, the processor directly controls the steering output unit 200 based on the limp aside operation of the autonomous driving mode (S8). Accordingly, the processor warns that the steering abnormality has occurred by turning on the red warning light.

Meanwhile, when it is determined as a result of the determination in step S3 that the first steering signal is smaller than the reference value, the processor determines that the first reducer 141 is damaged (lock-fail determination), and accordingly, performs the above-described step S8.

Figure 5:
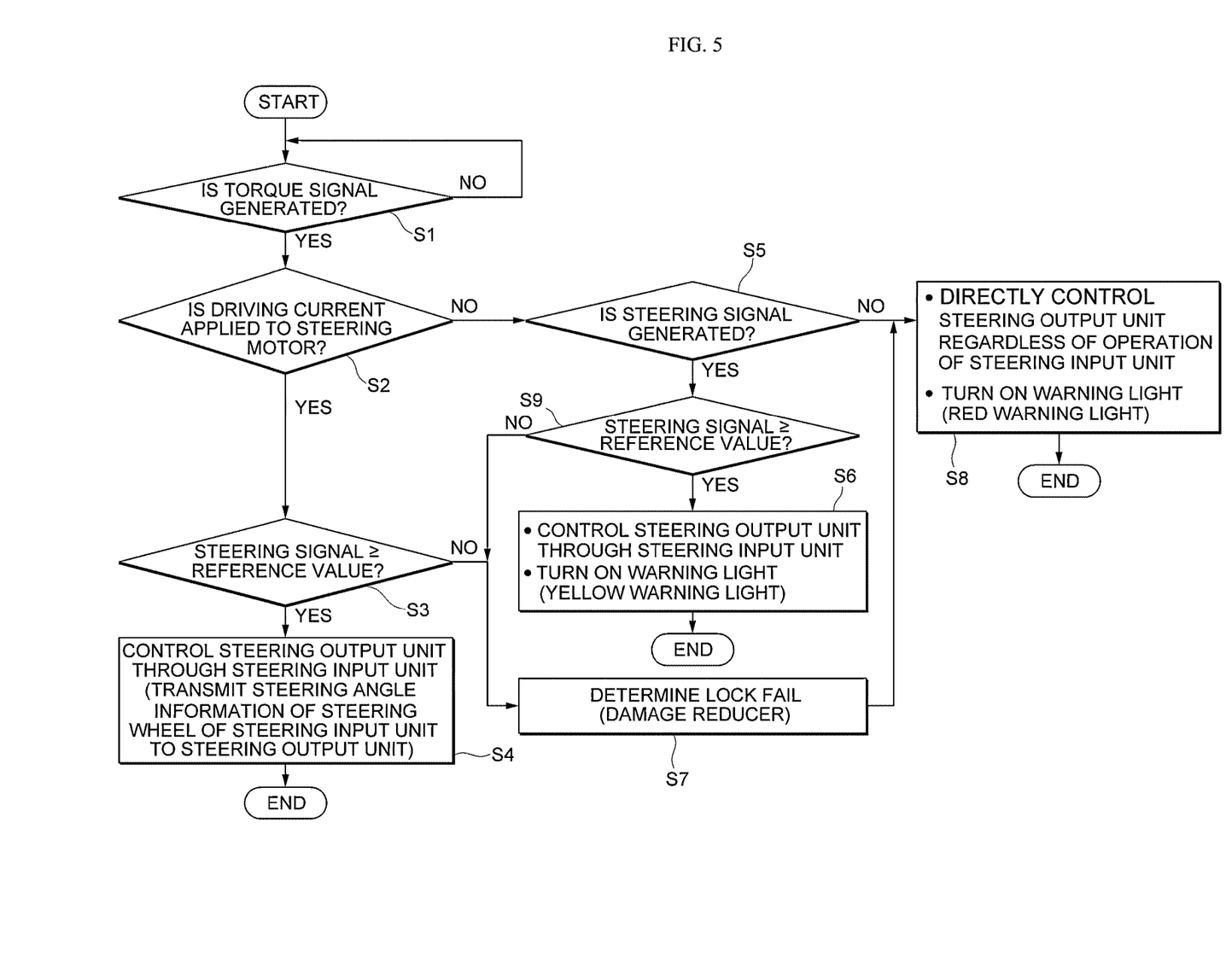
FIG. 5 is a flowchart illustrating an example of a vehicle steering method according to an embodiment of the present disclosure.

FIG. 5 is a flowchart illustrating an example of the vehicle steering method according to the embodiment of the present disclosure.

The vehicle steering method according to the embodiment of the present disclosure illustrated in FIG. 5 may be performed by the processor (e.g., a vehicle and/or at least one processor in the vehicle). For example, the vehicle steering method according to the embodiment of the present disclosure may be initiated by the processor receiving a torque detection signal from the torque sensor 110.

The vehicle steering method of FIG. 5 further includes step S9 compared to the above-described vehicle steering method of FIG. 4. Step S9 is located between steps S5 and S6.

When it is confirmed that the first steering signal has been generated, in step S9, the processor determines whether the first steering signal is greater than or equal to the reference value (S9). Here, the first steering signal compared with the reference value may be, for example, the absolute value of the first steering signal.

When it is confirmed as a result of the comparison in step S9 that the first steering signal is greater than or equal to the reference value (e.g., when it is confirmed that the steering wheel 190 is normally steered), the processor performs the above-described step S6.

Meanwhile, when it is determined as a result of the determination in step S9 that the first steering signal is smaller than the reference value, the processor determines that the first reducer 141 is damaged (lock-fail determination), and accordingly, performs the above-described step S8.

The vehicle steering method of FIG. 5 may more clearly determine whether the steering signal is abnormal compared to the vehicle steering method of FIG. 4.

The method and/or various embodiments described above may be implemented in digital electronic circuitry, computer hardware, firmware, software, and/or combinations thereof. Various embodiments of the present disclosure are executed by a data processing device, for example, one or more programmable processors and/or one or more computing devices, or may be implemented in a computer program stored in a computer-readable recording medium and/or computer-readable recording medium. The above-described computer program may be written in any form of programming language, including a compiled language or an interpreted language, and may be distributed in any form such as a stand-alone program, a module, and a subroutine. The computer program may be distributed via one computing device, a plurality of computing devices connected via the same network, and/or a plurality of distributed computing devices to be connected via a plurality of different networks.

The method and/or various embodiments described above may be performed by one or more processors that are configured to execute one or more computer programs that process, store, and/or manage any functions, functions, etc., by operating based on input data or generating output data. For example, the method and/or various embodiments of the present disclosure may be performed by a special purpose logic circuit such as a Field Programmable Gate Array (FPGA) or Application Specific Integrated Circuit (ASIC), and the apparatus and/or system for executing the method and/or various embodiments of the present disclosure may be implemented as special purpose logic circuits such as FPGA or ASIC.

One or more processors executing the computer program may include general purpose or special purpose microprocessors and/or one or more processors of any kind of digital computing device. The processor may receive instructions and/or data from each of the read-only memory and the random access memory, or may receive instructions and/or data from the read-only memory and the random access memory. In this disclosure, components of a computing apparatus executing the method and/or embodiments may include one or more processors for executing instructions and one or more memory devices for storing instructions and/or data.

According to an embodiment, the computing device may transmit/receive data to and from one or more mass storage devices for storing data. Here, the computing device may include a vehicle and/or a roadside device. For example, the computing device may receive data from, and/or transmit data to, a magnetic disc or optical disc. A computer-readable storage medium suitable for storing instructions and/or data associated with a computer program may include, but is not limited thereto, any type of non-volatile memory including a semiconductor memory device such as an erasable programmable read-only memory (EPROM), an electrically erasable PROM (EEPROM), or a flash memory device. For example, the computer-readable storage medium may include a magnetic disk such as an internal hard disk or a removable disk, a magneto-optical disk, and CD-ROM and DVD-ROM disks.

To provide interaction with a user, the computing device may include, but is not limited to, a display device (e.g., a cathode ray tube (CRT), a liquid crystal display (LCD), etc.) for providing or displaying information to the user and a pointing device (e.g., keyboard, mouse, trackball, etc.) through which the user may provide input and/or instructions or the like to the computing device. That is, the computing device may further include any other type of devices for providing interaction with the user. For example, the computing device may provide the user with any form of sensory feedback, including visual feedback, auditory feedback, and/or tactile feedback, for interaction with the user. In contrast, the user may provide an input to the computing device through various gestures such as sight, voice, and motion.

In the present disclosure, various embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

The computing device based on the exemplary embodiments described herein may be implemented using hardware and/or software configured to interact with a user, including a user device, a user interface (UI) device, a user terminal, or a client device. For example, the computing device may include a portable computing device such as a laptop computer. Additionally or alternatively, the computing device may include, but is not limited thereto, personal digital assistants (PDA), a tablet PC, a game console, a wearable device, an internet of things (IoT) device, a virtual reality (VR) device, an augmented reality (AR) device, and the like. The computing device may further include other types of devices configured to interact with the user. In addition, the computing device may include a portable communication device (e.g., a mobile phone, a smart phone, a wireless cellular phone, etc.) suitable for wireless communication over a network such as a mobile communication network, and the like. The computing device may be configured to wirelessly communicate with a network server using wireless communication technologies and/or protocols such as radio frequency (RF), microwave frequency (MWF), and/or infrared ray frequency (IRF).

Various embodiments in this disclosure, including specific structural and functional details, are exemplary. Accordingly, the embodiments of the present disclosure are not limited to the above, and may be implemented in various other forms. In addition, the terminology used in the present disclosure is for describing some embodiments and is not to be construed as limiting the embodiments. For example, singular words and the above may be construed to include the plural as well, unless the context clearly dictates otherwise. Unless defined otherwise in this disclosure, all the terms used in the present specification, including technical and scientific terms, have the same meanings as meanings that are generally understood by those skilled in the art to which the present disclosure pertains. In addition, commonly used terms such as predefined terms should be interpreted as having a meaning consistent with the meaning in the context of the related art.

Although the present disclosure has been described in connection with some embodiments herein, various modifications and changes can be made without departing from the scope of the present disclosure that can be understood by those skilled in the art to which the present disclosure pertains. Further, such modifications and changes are intended to fall within the scope of the claims appended hereto.

DETAILED DESCRIPTION OF MAIN ELEMENTS

100: Steering input unit
200: Steering output unit
190: Steering wheel
110: Torque sensor
121: Steering sensor
141: Reducer
160: Steering feedback actuator
160: Steering control module
171: Electronic control unit
181: Steering motor
222: Steering sensor
242: Reducer
250: Road wheel actuator
272: Electronic control unit
282: Steering motor
500: Control unit
600: Battery

What is claimed is:

1. A vehicle steering device comprising:
   a steering input unit;
   a steering output unit connected to the steering input unit and a wheel; and
   a control unit configured to control the steering input unit and the steering output unit,
   wherein the steering input unit includes:
   a torque sensor configured to detect a torque of a steering wheel and generate a torque signal corresponding to the torque of the steering wheel; and
   a first steering sensor configured to detect a steering angle of the steering wheel and generate a steering signal corresponding to the steering angle of the steering wheel,
   wherein, when the torque signal is generated and the steering signal is not generated or smaller than a reference value, the control unit directly controls the steering output unit according to a preset autonomous driving mode regardless of the operation of the steering input unit.

2. The vehicle steering device of claim 1, wherein the autonomous driving mode includes a limp aside operation.

3. The vehicle steering device of claim 1, wherein, when a steering abnormality of the steering input unit occurs, the control unit warns the steering abnormality.

4. The vehicle steering device of claim 3, wherein, when the steering abnormality occurs in the steering input unit, the control unit turns on a first warning light to warn the steering abnormality.

5. The vehicle steering device of claim 1, wherein, when an abnormality occurs in a steering reaction force of the steering input unit, the control unit controls the steering output unit through the steering input unit.

6. The vehicle steering device of claim 5, wherein, when an abnormality occurs in the steering reaction force of the steering input unit, the control unit warns that an abnormality has occurred in the steering reaction force.

7. The vehicle steering device of claim 6, wherein, when the abnormality occurs in the steering reaction force of the steering input unit occurs, the control unit turns on a second warning light to warn the abnormality in the steering reaction force.

8. The vehicle steering device of claim 1, wherein the steering input unit further includes:
   a first reducer connected to the steering wheel; and
   a steering control module configured to control the first reducer based on a torque signal from the torque sensor and a steering signal from the first steering sensor.

9. The vehicle steering device of claim 8, wherein the steering control module includes:
   a first steering motor connected to the first reducer; and
   a first electronic control unit configured to control the first steering motor based on the torque signal from the torque sensor and the steering signal from the first steering sensor.

10. The vehicle steering device of claim 1, wherein the steering output unit includes:
    a second steering sensor configured to detect a steering angle of the steering wheel;
    a second reducer connected to a wheel steering unit for controlling the steering of the wheel; and
    a wheel control module configured to control the second reducer based on control from at least one of the steering input unit and the control unit and transmit a steering signal from the second steering sensor to the steering input unit.

11. The vehicle steering device of claim 10, wherein the wheel control module includes:
    a second steering motor connected to the second reducer; and
    a second electronic control unit configured to control the second steering motor based on control from at least one of the steering input unit and the control unit.

12. The vehicle steering device of claim 1, wherein the steering input unit and the steering output unit are connected by a wire.

13. A vehicle steering method by a vehicle steering device including a steering input unit including a steering wheel, a torque sensor detecting a torque of the steering wheel, a steering sensor detecting a steering angle of the steering wheel, and a steering output unit connected to the steering input unit a wheel, the vehicle steering method comprising:
   determining whether a torque signal corresponding to the torque of the steering wheel is generated from the torque sensor;
   determining whether a steering signal corresponding to the steering angle of the steering wheel is generated from the steering sensor when the torque signal is generated from the torque sensor; and
   directly controlling the steering output unit according to a preset autonomous driving mode when the steering signal is not generated from the steering sensor or is smaller than a reference value, regardless of an operation of the steering input unit.

14. The vehicle steering method of claim 13, wherein the autonomous driving mode includes a limp aside operation.

15. The vehicle steering method of claim 13, further comprising:
   warning a steering abnormality when the steering signal is not generated from the steering sensor.

16. The vehicle steering method of claim 15, wherein the warning of the steering abnormality includes turning on a first warning light.

17. The vehicle steering method of claim 13, further comprising:
   determining whether a driving current is applied to the steering motor when a torque detection signal is generated from the torque sensor.

18. The vehicle steering method of claim 17, wherein the determining whether the steering detection signal is generated is performed when the driving current is not applied to the steering motor.

\* \* \* \* \*